United States Patent
Cariello

(10) Patent No.: US 11,544,182 B2
(45) Date of Patent: Jan. 3, 2023

(54) SMART FACTORY RESET PROCEDURE USING ONE OR MORE COMMANDS AT LEAST ON USER DATA AND SYSTEM DATA

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 85 days.

(21) Appl. No.: 16/917,510

(22) Filed: Jun. 30, 2020

(65) Prior Publication Data
US 2021/0406168 A1 Dec. 30, 2021

(51) Int. Cl.
*G06F 12/02* (2006.01)
*G06F 12/0891* (2016.01)

(52) U.S. Cl.
CPC ...... *G06F 12/0246* (2013.01); *G06F 12/0253* (2013.01); *G06F 12/0292* (2013.01); *G06F 12/0891* (2013.01); *G06F 2212/1032* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2010/0211770 A1* | 8/2010 | Alrabady | H04W 12/082 713/150 |
| 2016/0179398 A1* | 6/2016 | Ioannou | G06F 3/0679 711/103 |
| 2016/0196145 A1* | 7/2016 | Liverance | G06F 9/24 713/2 |
| 2016/0253348 A1* | 9/2016 | Mauti, Jr. | G06F 16/17 707/692 |
| 2016/0292039 A1* | 10/2016 | Lee | G06F 8/62 |

(Continued)

OTHER PUBLICATIONS

J. Kwak, H. C. Kim, I. H. Park and Y. H. Song, "Anti-forensic deletion scheme for flash storage systems," 2016 IEEE International Conference on Network Infrastructure and Digital Content (IC-NIDC), 2016, pp. 317-321, doi: 10.1109/ICNIDC.2016.7974588. (Year: 2016).*

(Continued)

*Primary Examiner* — Jared I Rutz
*Assistant Examiner* — Marwan Ayash
(74) *Attorney, Agent, or Firm* — Holland & Hart LLP

(57) ABSTRACT

Methods, systems, techniques, and devices for smart factory reset procedures are described. In accordance with examples as disclosed herein, a memory system may receive one or more commands associated with a reset procedure. The memory system may identify, in response to the one or more commands, a first portion of one or more memory arrays of the memory system as storing user data and a second portion of the one or more memory arrays as storing data associated with an operating system. The memory system may update a mapping of the memory system based on identifying the first portion and the second portion. The memory system may transfer the data associated with the operating system to a third portion of the one or more memory arrays and perform an erase operation on a subset of physical addresses of the set of physical addresses.

25 Claims, 5 Drawing Sheets

(56) References Cited

U.S. PATENT DOCUMENTS

| | | | |
|---|---|---|---|
| 2017/0060768 A1* | 3/2017 | Zhang | G06F 3/064 |
| 2018/0225200 A1* | 8/2018 | Seo | G06F 12/0646 |
| 2019/0121570 A1* | 4/2019 | Kim | G06F 3/0608 |
| 2020/0082103 A1* | 3/2020 | Heidinga | G06F 16/2246 |
| 2020/0098049 A1* | 3/2020 | Jack | G06F 21/6245 |
| 2021/0318954 A1* | 10/2021 | Ke | G06F 12/0246 |

OTHER PUBLICATIONS

P. Tiwari, C. S. Skanda, U. Sanjana, S. Aruna and P. Honnavalli, "Secure Wipe Out in BYOD Environment," 2020 International Workshop on Big Data and Information Security (IWBIS), 2020, pp. 109-114, doi: 10.1109/IWBIS50925.2020.9255627. (Year: 2020).*

* cited by examiner

SMART FACTORY RESET PROCEDURE USING ONE OR MORE COMMANDS AT LEAST ON USER DATA AND SYSTEM DATA

BACKGROUND

The following relates generally to one or more systems for memory and more specifically to smart factory reset procedures.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

In some systems that include a memory system, a factory reset procedure may be performed. For example, a user may wish to restore a memory system to a factory (e.g., initial or prior) state. However, conventional approaches to factor reset procedures may suffer from one or more deficiencies.

DETAILED DESCRIPTION

Figure 1:
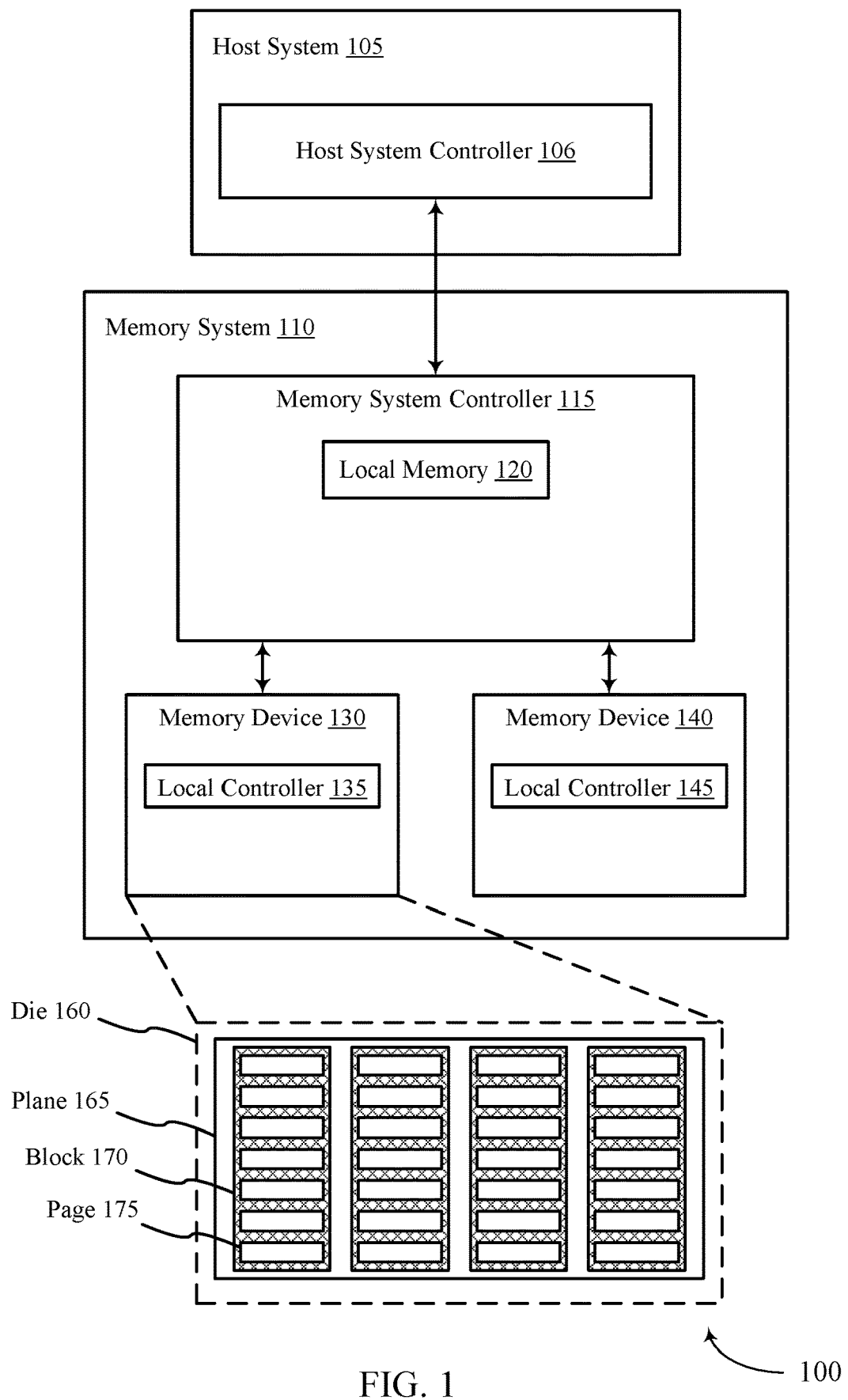
FIG. 1 illustrates an example of a system that supports smart factory reset procedure in accordance with examples as disclosed herein.

In some systems, a host system may perform a factory reset procedure. For example, a user may wish to restore a device to a factory state and may initiate the factory reset procedure at the host system. In response, the host system may perform the factory reset procedure for a memory system. For example, the host system may remove user data of the memory system and maintain operating system (OS) data of the memory system, such as an OS image.

In some cases, the host system may execute or otherwise coordinate the factory reset procedure by issuing a set of unmap commands for the user data (e.g., rather than a single unmap command for a relatively large amount of data, which may result in an unmap operation with a latency causing a system timeout). The host system may, additionally or alternatively, issue a command (e.g., a purge command) to erase the unmapped user data, which may ensure that the user data is physically erased from the storage for security purposes. However, some reset procedures may be relatively inefficient. For example, the memory system may be unaware that a set of commands collectively correspond to the factory reset procedure, and thus the memory system may perform various operations in response to each individual command in the same way as outside of a factory reset context, which may result in various inefficiencies.

For example, as part of performing unmap operations in response to each individual unmap command of the set of unmap commands, the memory system may update various mapping tables, which may be inefficient (e.g., a waste of time and resources) in view of the soon forthcoming purge command. As another example, the memory system may search and relocate remaining mapped data before executing an erase operation in response to the purge command, which may involve further mapping update operations that are unnecessary or otherwise inefficient when the purge command is in connection with a factory reset procedure. Such operations may result in relatively longer times for performing the reset procedure and increased power consumption of the memory system.

The systems, devices, and techniques described herein may enable a memory system to realize improved efficiency of factory reset procedures, such as relatively shorter times (e.g., latencies) for performing a reset procedure and reduced power consumption, among other benefits. For example, a host system may send one or more commands to a memory system to perform a reset procedure, which may be a factory reset procedure. The memory system may identify the reset procedure based on receiving the one or more commands. For example, the memory system may determine that a reset procedure is being performed based on a pattern recognition of the one or more commands (e.g., a pattern of commands, such as a set of unmap commands followed by a purge command, may be autonomously recognized by the memory system as collectively instructing the memory device to perform the reset procedure). Additionally or alternatively, the one or more commands may include a command defined as a factory reset command.

In response to the one or more commands associated with the reset procedure, the memory system may identify a first portion of the memory system as storing user data (e.g., using mapping information indicating a first set of physical locations storing the user data). The memory system may identify a second portion of the memory system as storing OS data (e.g., using mapping information indicating a second set of physical locations storing an OS image). The memory system may update a mapping based on identifying the first portion and the second portion. For example, the memory system may unmap the first portion storing the user data (e.g., the memory system may update a higher level logical to physical (L2P) table to logically unmap an area of one or more memory arrays that includes the user data). The memory system may transfer the OS data (e.g., an OS image) from the second portion of the memory system to a third portion of the memory system. The memory system may perform an erase operation based on the transferring. For example, the memory system may physically erase memory blocks (e.g., blocks with an older version than one or more blocks storing the relocated OS data at the third portion of the memory system). By implementing such techniques, the host system or the memory system may realize enhanced efficiency for reset procedures.

Features of the disclosure are initially described in the context of systems and dies as described with reference to FIG. 1. Features of the disclosure are described in the context of process flows and flowcharts as described with reference to FIGS. 2 and 3. These and other features of the disclosure are further illustrated by and described with reference to an apparatus diagram and flowcharts that relate to smart factory reset procedure as described with reference to FIGS. 4 and 5.

FIG. 1 is an example of a system 100 that supports smart factory reset procedures in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (Fe-RAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support smart factory reset procedures. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

In some examples, the system 100 may implement one or more operations to increase to realize improved efficiency of factory reset procedures, such as relatively shorter times for performing a reset procedure and reduced power consumption, among other benefits. For example, the host system 105 may send one or more commands to the memory system 110 as part of a reset procedure. The memory system 110 (e.g., the memory system controller 115, the memory device 130, the memory device 140, etc.) may identify the reset procedure based on receiving the one or more commands (e.g., may identify that the one or more commands collectively instruct the memory system 100 to perform the reset procedure). For example, the one or more commands may include a factory reset command. Additionally or alternatively, the memory system 110 may determine that a reset procedure is being performed based on a pattern recognition of the one or more commands (e.g., a set of unmap commands followed by a purge command).

The memory system 110 may identify a first portion of the memory system 110 as storing user data (e.g., using mapping information indicating a first set of physical locations of a memory device 130 storing the user data). The memory system 110 may identify a second portion of the memory system 110 as storing OS data (e.g., using mapping information indicating a second set of physical locations storing an OS image). The memory system 110 may update a mapping based on identifying the first portion and the second portion. For example, the memory system 110 may unmap the first portion storing the user data (e.g., the memory system 110 may update a higher level L2P table to logically unmap an area of one or more memory arrays that includes the user data). The memory system 110 may transfer the OS data (e.g., an OS image) from the second portion of the memory system 110 to a third portion of the memory system 110. The memory system 110 may perform an erase operation based on the transferring. For example, the memory system 110 may physically erase memory blocks (e.g., blocks with an older version than one or more blocks storing the relocated OS data at the third portion of the memory system 110). By implementing such techniques, the system 100 may realize enhanced efficiency for reset procedures.

Figure 2:
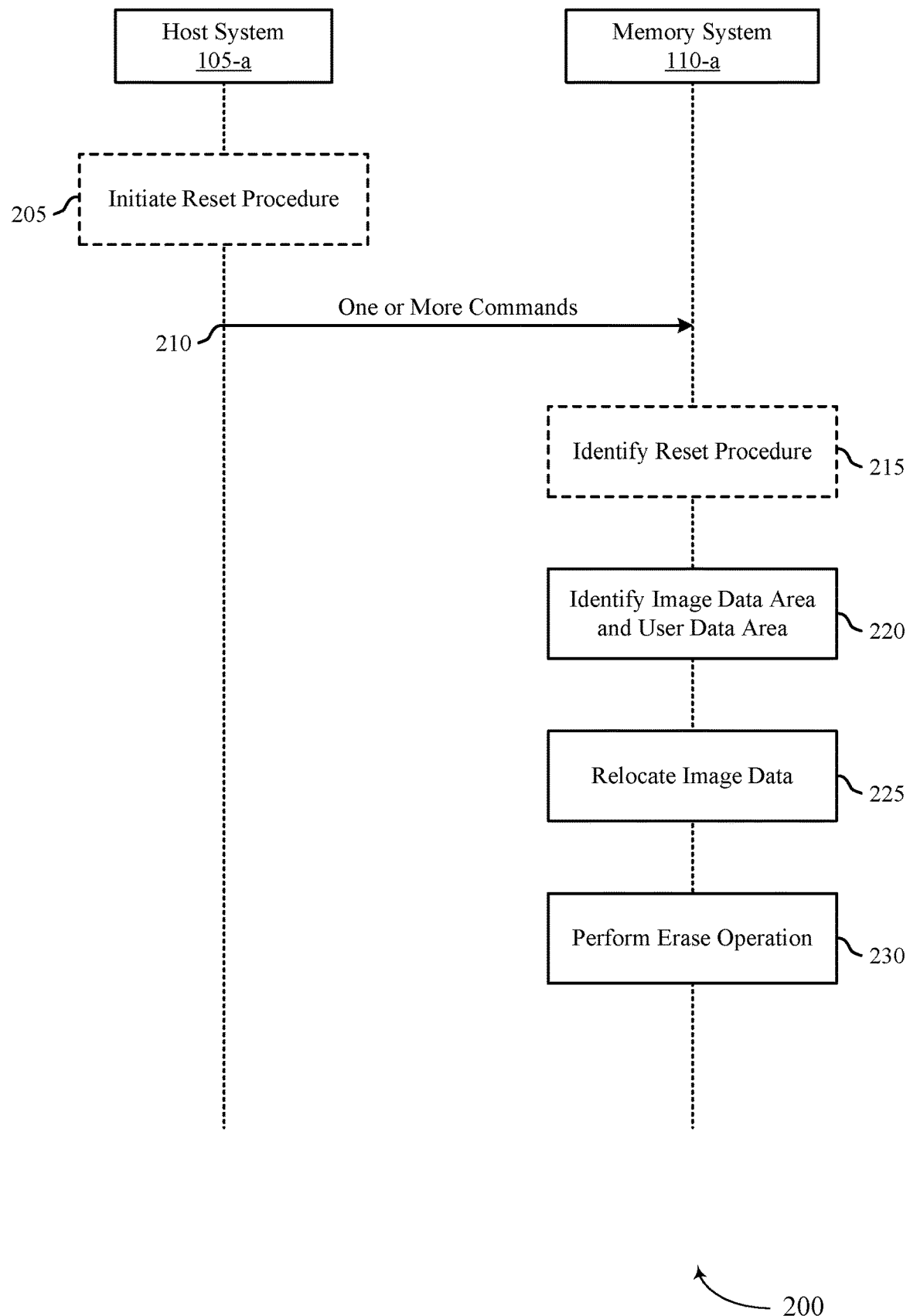
FIG. 2 illustrates an example of a process flow that supports smart factory reset procedure in accordance with examples as disclosed herein.

FIG. 2 illustrates an example of a process flow 200 that supports smart factory reset procedures in accordance with examples as disclosed herein. The process flow 200 may be implemented by processing logic that may include hardware (e.g., processing device, circuitry, dedicated logic, programmable logic, microcode, hardware of a device, integrated circuit, etc.), software (e.g., instructions run or executed on a processing device), or a combination thereof. In some examples, the process flow 200 may be implemented by a system as described herein. For example, the process flow 200 may be implemented by a host system 105-a and a memory system 110-a, which may be examples of the corresponding systems described with reference to FIG. 1. In some examples, a system may execute a set of codes to control the functional elements of the system to perform the operations described below. Additionally or alternatively, the system may perform aspects of the operations described below using special-purpose hardware. In some examples, the memory system 110-a (e.g., a memory device 130 of the memory system 110-a) may include a memory array having a plurality of multi-level NAND memory cells. However, the techniques described herein may be applied to other memory architectures, and other configurations of host systems 105 and memory systems 110.

The host system 105-a and the memory system 110-a may be enabled with improved reset procedures. For example, the host system 105-a and the memory system 110-a may be configured to perform operations utilizing one or more characteristics of firmware of a device to more efficiently perform a reset procedure, which may result in enhanced efficiency, reduced power consumption, improved user experiences, among other benefits. As an illustrative example, the one or more characteristics may include an OS image (e.g., to be preserved in a reset procedure) located at the beginning of a relatively large logic unit number (LUN) address range. Additionally or alternatively, a user partition (e.g., a portion of the memory system 110-a storing user data) may be located at the end of the LUN address range or may be unmapped (e.g., completely unmapped, for example, as part of the reset procedure). The operations of process flow 200 or flowchart 300 may be implemented to utilize such characteristics to realize the improved reset procedures. For example, redundant mapping updates throughout a reset procedure may be avoided using the techniques described herein, a memory system 110-a may be enabled to identify that a reset procedure has been initiated at the host device 105-a, among other benefits.

In some examples, at 205, the host system 105-a may initiate a reset procedure. For example, a user of the host system 105-a or the memory system 110-a may wish to restore a device to a factory state (e.g., a state without user specific data being stored at the device). In some examples, the host system 105-a may receive input from a user indicating the initiation of the reset procedure. The host system 105-a may initiate one or more operations to remove user data of the device and maintain (e.g., read and re-write) OS data of the device, such as an OS image associated with the device (e.g., a device including the host system 105-a or the memory system 110-a).

At 210, the host system 105-a may transmit one or more commands to the memory system 110-a as part of the reset procedure, for example, based on initiating the reset procedure. In some examples, the host system 105-a may be configured to transmit one command indicating the reset procedure. In some other examples, the host system 105-a may transmit a set of commands as part of the reset procedure. For example, the host system 105-a may transmit a set of unmap commands associated with a user data partition of the memory system 110-a, followed by a purge command (e.g., subsequent to or concurrent with transmitting the set of unmap commands) or other type of command to physically erase the unmapped user data (e.g., for security or confidentiality purposes) from the memory system 110-a following the unmapping of the user data (e.g., following the logical erasing of the user data).

In some examples, at 215, the memory system 110-a may identify the reset procedure based on receiving the one or more commands at 210. In some examples, the memory system 110-a may identify the reset procedure based on receiving a command indicating the reset procedure (e.g., using an interface with the host system 105-a for performing reset procedures). Additionally or alternatively, the memory system 110-a may be configured to automatically detect the reset procedure. For example, the memory system 110-a may determine a pattern of the one or more commands (e.g., a series of unmap commands followed by a purge command, among other examples of patterns of commands associated with a reset procedure). The memory system 110-a may identify the reset procedure based on the determined pattern.

At 220, the memory system 110-a may identify an image data area and a user data area. For example, the memory system 110-a may identify which physical locations of one or more memory arrays store OS data (e.g., data corresponding to an OS image to be preserved in the reset procedure) and which physical locations of the one or more memory arrays store user data (e.g., data corresponding to a user to be removed in the reset procedure). In some examples, such an identification may be based on mapping information. For example, the memory system 110-a may include mapping tables with a correspondence between logical addresses of the memory system 110-a and physical addresses of the memory system 110-a (e.g., an L2P mapping table with each entry including an indication of a logical memory block and an indication of one or more physical memory blocks in accordance with a granularity of the L2P mapping table). Additionally or alternatively, the memory system 110-a may identify the data areas based on a min-max logical black address (LBA) table for physical blocks, one or more bitmaps of memory blocks including user data or OS data, etc.

The memory system 110-a may update mapping information based on identifying the image area and the user area. For example, the memory system 110-a may update a mapping table (e.g., a higher level L2P table) to logically unmap the user area. As an illustrative example, a lower hierarchal level L2P table may include one or more entries linking logical addresses of the user area to physical addresses of the user area. The memory system 110-a may update (e.g., remove or modify) one or more entries in a higher level L2P table, which may remove the one or more entries mapped in the lower level tables corresponding to the higher level L2P table, among other examples of updating mapping information to logically unmap the user area. Additionally or alternatively, an L2P table may include a set of mapping tables at different hierarchical levels (e.g., granularities), with tables at lower levels mapping to more granular (e.g., specific) physical locations (e.g., page addresses) and tables at higher levels mapping to less granular (e.g., specific) physical locations (e.g., block or plane addresses). Where a sufficiently large or contiguous portion of physical addresses are to be unmapped, updating a higher level table without updating one or more lower level tables may provide latency and efficiency benefits.

At 225, the memory system 110-a may relocate image data. For example, the memory system 110-a may transfer OS data from a portion of the memory system 110-a (e.g., a second portion) to another portion of the memory system 110-a (e.g., a third portion). In some examples, the memory system 110-a may implement a relocation scheme as described with reference to FIG. 3 to relocate the image data. For example, the memory system 110-*a* may read and re-write mapped data (e.g., OS data that was remains mapped after the memory system 110-*a* updates an L2P table to unmap the user data) following an LBA order.

At 230, the memory system 110-*a* may perform an erase operation. For example, the memory system 110-*a* may perform an erase operation for physical addresses (e.g., physical addresses including data to be removed as part of the reset procedure, such as user data). As an illustrative example, the memory system 110-*a* may stop using a current host block (e.g., a block where the latest data is written and/or the block is associated with a first block version), open a new memory block with a different block version (e.g., a second block version relatively more recent than the first block version) and transfer the OS to the new memory blocks at 225. The memory system 110-*a* may perform the erase operation for blocks with a version older than the new memory block opened prior to relocating the image data. For example, the memory system 110-*a* may physically erase memory blocks with an older block version (e.g., the memory system 110-*a* may erase the first portion of the one or more memory arrays associated with the user data and the second portion of the one or more memory arrays including the starting location of the OS data, and the memory system 110-*a* may retain the third portion of the one or more memory arrays including the relocated OS data).

In some examples, operations and signaling described with reference to the process flow 200 associated with the memory system 110-*a* may be performed by or otherwise supported by a memory system controller 115 as described with reference to FIG. 1. Although illustrated in the context of a host system 105-*a* and a memory system 110-*a*, in some examples, the described techniques may illustrate operations or signaling associated with a memory device 130 or a memory device 140 (e.g., a local controller 135, a local controller 145), which may or may not be supported by or communicated via a memory system controller 115. In some examples, certain operations or signaling illustrated by the memory system 110-*a* may be performed at a system level (e.g., by a memory system controller 115) and certain operations or signaling may be performed at a device level (e.g., by a local controller 135, by a local controller 145). In various examples, a memory system controller 115, or a local controller 135, or a local controller 145, or a combination thereof, may be referred to as a control component coupled with a memory array of the memory system 110-*a* and configured to cause the memory system 110-*a* to perform various operations described herein. Moreover, in various examples, the host system 105-*a*, or a component thereof, may be referred to as a control component configured to be coupled with the memory system 110-*a* and configured to cause the host system 105-*a* to perform various operations described herein.

Figure 3:
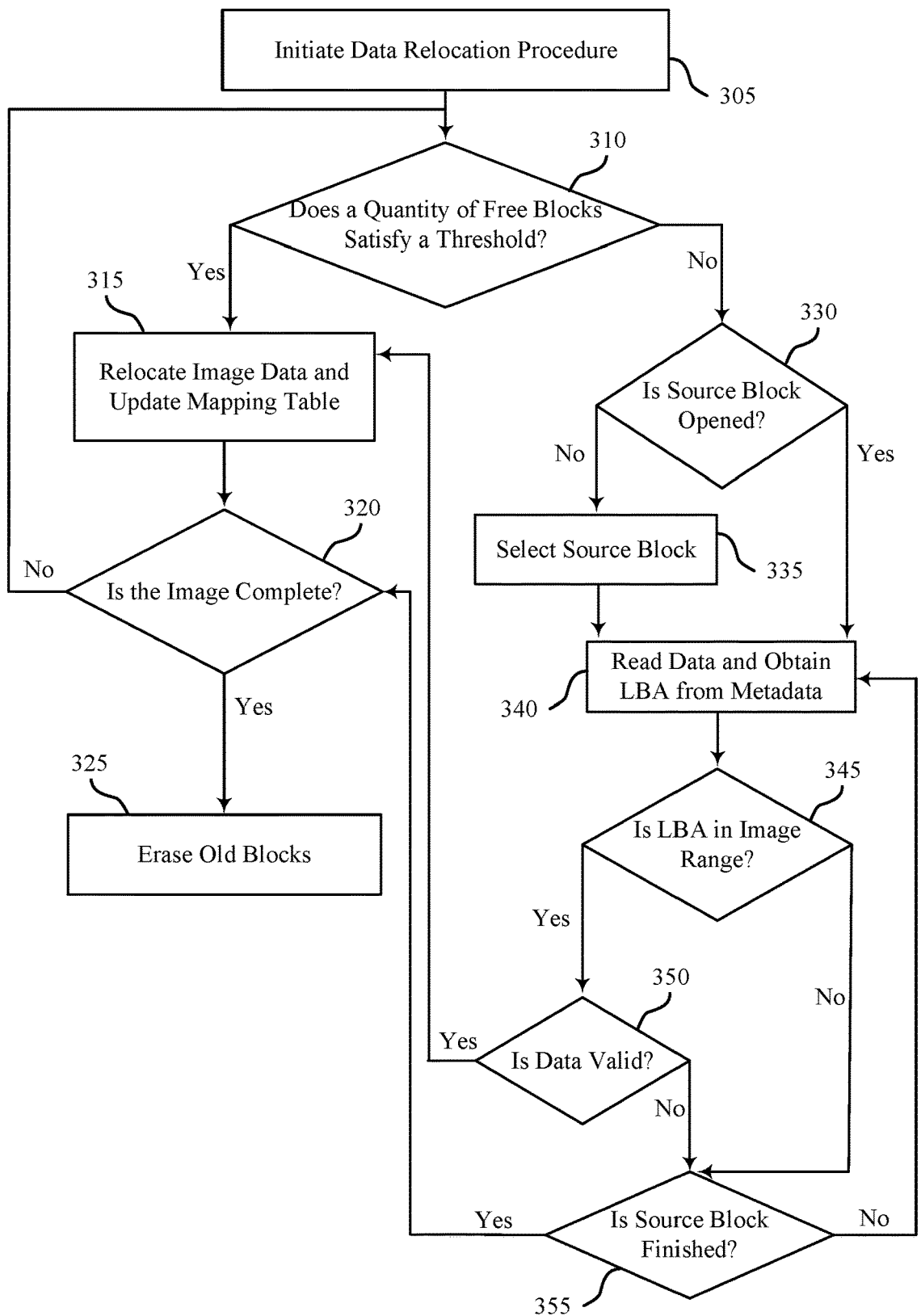
FIG. 3 illustrates an example of a flowchart that supports smart factory reset procedure in accordance with examples as disclosed herein.

FIG. 3 illustrates an example of a flowchart 300 that supports smart factory reset procedures in accordance with examples as disclosed herein. The flowchart 300 may be implemented by processing logic that may include hardware (e.g., processing device, circuitry, dedicated logic, programmable logic, microcode, hardware of a device, integrated circuit, etc.), software (e.g., instructions run or executed on a processing device), or a combination thereof. In some examples, the flowchart 300 may be implemented by a system as described herein. For example, the flowchart 300 may be implemented by a memory system 110, which may be examples of the corresponding system described with reference to FIGS. 1 and 2. The flowchart 300 may illustrate an example data relocation scheme, for example, that the memory system 100 may implement to relocate OS data as described herein.

In some examples, OS data may be located in a relatively compact physical space (e.g., a relatively contiguous space), for example, due to the OS data being sequentially written during a manufacturing phase of the device or a field system update, among other examples. Additionally or alternatively, the OS data may be considered "cold" data (e.g., the OS data may be accessed relatively infrequently). In some examples, the memory system (e.g., firmware of a MNAND device) may maintain some free memory blocks (e.g., memory blocks available for data storage), which may provide performance boost capabilities for the memory system. In some such examples, the memory system may relocate OS data without triggering one or more garbage collection procedures (e.g., cold blocks including the image data that is copied to a new block may be freed up during relocation and a pool of the free memory blocks may be automatically replenished prior to the relocation).

In some other examples, garbage collection procedures may be triggered during data relocation (e.g., the memory system may attempt to free up the "old" OS data relocated from the first portion of one or more memory arrays to a third portion of one or more memory arrays by refreshing the physical locations where the relocated data started). The memory system may implement techniques to identify invalid memory blocks, which may enable the memory system to avoid inefficiencies (e.g., timing penalties) caused by missing or incomplete unmap operations. For example, the memory system may maintain a bitmap of memory blocks including image data, the memory system may track minimum and maximum LBAs contained by each physical block, among other examples of techniques to identify the invalid memory blocks. The memory system may refrain from performing garbage collection procedures for the identified invalid blocks, for example, until the end of the reset procedure when the "older" blocks may be erased, which may improve efficiency by avoiding erasing the blocks in small portions at a time rather than erasing all of the blocks in larger portions.

Additionally or alternatively, the memory system may implement one or more aspects of the flowchart 300 to incorporate new block creation into a relocation procedure. For example, the flowchart 300 may enable a memory system to ensure there is a free memory block (e.g., a target memory block) available for data storage (e.g., for data relocation from a source memory block) without triggering a relatively large amount of garbage collection procedures. In some examples, a source block or a target block may be or correspond to a virtual block (e.g., a virtual block may correspond to a set of physical blocks of one or more memory arrays). Such a data relocation scheme may result in improved efficiency of the reset procedure, among other benefits.

At 305, a data relocation procedure may be initiated. For example, a memory system may initiate a data relocation procedure (e.g., in order to start transferring OS data from a first physical portion of one or more memory arrays to a different physical portion the one or more memory arrays as part of a reset procedure). In some examples, the memory system may identify the first physical portion as an OS image area and the different physical portion may be a target area including one or more free memory blocks available for data storage.

At 310, it may be determined whether a quantity of free memory blocks satisfies a threshold. For example, the memory system may determine whether a quantity of free memory blocks satisfies the threshold quantity of free memory blocks. In some examples, the memory system may determine that a quantity of free memory blocks (e.g., two or more free memory blocks) satisfies the threshold of free memory blocks (e.g., at least two free memory blocks) to proceed to 315. In such examples, image data may be relocated and a mapping table may be updated. For example, the memory system may transfer some OS image data (e.g., from a source block of the first portion of the one or more memory arrays that store the OS data) to at least one of the quantity of free memory blocks (e.g., the memory system may select one of the free memory blocks as a target block for relocating the image data). The memory system may update mapping information based on transferring the data. For example, the memory system may update a mapping table to include a correspondence between the logical addresses of the relocated image data and the physical addresses of the relocated image data.

At 320, it may be determined whether the image is complete. For example, the memory system may determine whether there is remaining OS data (e.g., OS image data, among other examples of data preserved in a reset procedure) to transfer from an identified portion of the one or more memory arrays storing the OS data. In some examples, the memory system may determine that the image is complete. In such examples, at 325, the old blocks may be erased. For example, the memory system may perform an erase operation for one or more source blocks (e.g., memory blocks that stored the OS data prior to relocation of the OS data), as described with reference to FIG. 2. In some other examples, the memory system may determine that the image is incomplete. For example, the target memory block available for data storage at 310 may be completed (e.g., the target memory block may not include available storage area), but the memory system may determine there is more OS data to be relocated to complete the image. In such examples, the memory system may return to 310.

In some examples, at 310 it may be determined that a quantity of free blocks fails to satisfy a threshold. For example, a memory system may determine that a quantity of free blocks (e.g., one block available for data storage) is lower than a threshold quantity (e.g., two blocks available for data storage). In such examples, the memory system may proceed to 330.

At 330, it may be determined whether a source block is opened. For example, a memory system may determine that a source block has not been opened for data relocation. In such examples, at 335 a source block may be selected. For example, the memory system may select a memory block storing OS data from a portion of one or more memory arrays. If the memory system determines that a source block is open at 330, or the memory system selects a source block at 335, the memory system may proceed to 340.

At 340, data or metadata may be read and an LBA of the source block may be obtained. For example, the memory system may identify an LBA of some data in the source block by reading the metadata. Additionally or alternatively, the memory system may read the data using a read operation (e.g., in order to relocate the data to a target memory block using a re-write operation).

At 345, it may be determined whether the LBA is in an image range. For example, a memory system may determine whether the identified LBA is within a range of LBAs that correspond to LBAs storing OS data (e.g., the memory system may compare the LBA to mapping information including the range of LBAs storing OS data).

In some examples, if the LBA is within the image range, at 350 it may be determined whether the data is valid. For example, the memory system may read the data and determine that the data is valid and the LBA associated with the data is within the image range. In such examples, the memory system may proceed to 315 (e.g., the valid data may be relocated to a target memory block).

In some other examples, if the LBA is not within the image range or if the data is not valid data, it may be determined whether the source block is finished. For example, the memory system may determine that the source block is not finished (e.g., that further LBAs and data that may be valid and within the image range remain in the source block). In such examples, the memory system may proceed to 340 and repeat 340 through 355 until the source block is finished. For example, the memory system may determine that the source block is finished (e.g., each valid OS data within the image range has been relocated to a target memory block) and the memory system may proceed to 320. The memory system may repeat one or more of the various operations described herein until the image is complete.

In some examples, a memory system (or a host system) may realize one or more advantages by implementing the operations of the flowchart 300. For example, at 310, by proceeding to 315 if a threshold quantity of free blocks is satisfied (e.g., two or more blocks are available for data storage), the memory system may relocate data relatively efficiently. If at 310 the threshold quantity of blocks is not satisfied (e.g., there is only one free block remaining to be a target block but there may be more than one source block of OS data remaining to complete the image), by proceeding to 330 through 355 the memory system may use new block creation as part of the data relocation scheme. For example, valid data from the source block may be transferred to a target block (e.g., a last remaining free memory block at 310) until the source block is finished. In some examples, upon determining that the source block is finished (e.g., the source block does not include OS data to be preserved in a reset procedure), the memory system may erase the data of the finished source block to be a new free memory block, and the memory system may implement operations 310 through 355 until the image is complete.

Figure 4:
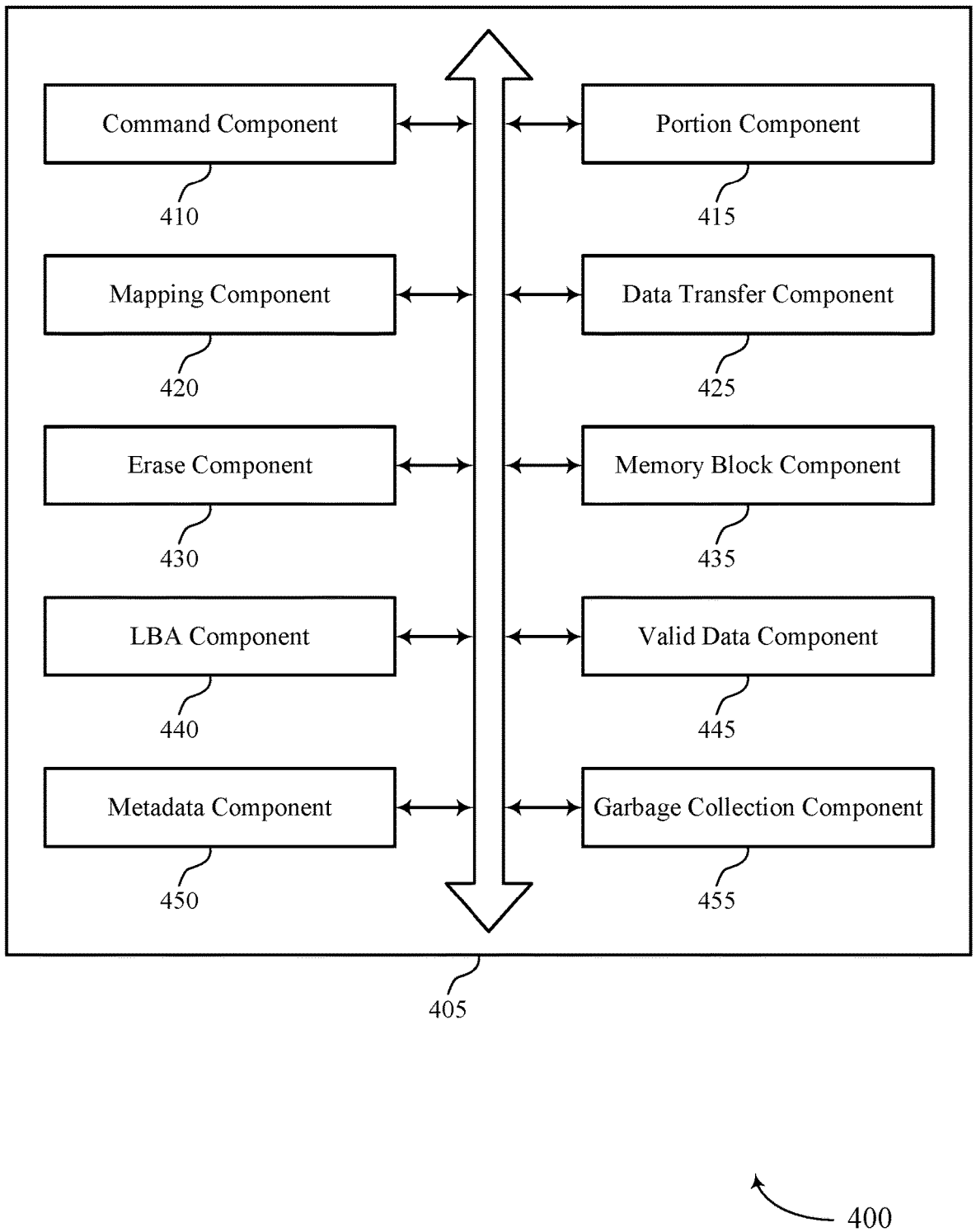
FIG. 4 shows a block diagram of a memory array that supports smart factory reset procedure in accordance with aspects of the present disclosure.

FIG. 4 shows a block diagram 400 of components of a memory system 405 that supports smart factory reset procedures in accordance with examples as disclosed herein. The components of memory system 405 may be an example of aspects of a memory system as described with reference to FIGS. 1-3. The memory system 405 may include a command component 410, a portion component 415, a mapping component 420, a data transfer component 425, an erase component 430, a memory block component 435, a LBA component 440, a validation component 445, a metadata component 450, and a garbage collection component 455. Each of these modules may communicate, directly or indirectly, with one another (e.g., via one or more buses). For example, in some cases, some or all components of memory system 405 may be included in a memory system controller 115 as described with reference to FIG. 1. Additionally or alternatively, some or all components of memory system 405 may be included in a local controller 135 as described with reference to FIG. 1.

The command component 410 may receive one or more commands associated with a reset procedure of the one or more memory arrays. In some examples, the command component 410 may identify the reset procedure based on the one or more commands including a pattern of unmap commands and a purge command.

The portion component 415 may identify, in response to the one or more commands, a first portion of the one or more memory arrays as storing user data and a second portion of the one or more memory arrays as storing data associated with an operating system.

The mapping component 420 may update a mapping of the memory system based on identifying the first portion and the second portion, the mapping including a correspondence between a set of logical addresses and a set of physical addresses of the one or more memory arrays. In some cases, the mapping includes a first table at a first hierarchical level and a second table at a second hierarchical level below the first hierarchical level, and where updating the mapping includes unmapping at least a portion of the first table, at least the portion of the first table corresponding to the first portion of the one or more memory arrays. In some cases, the mapping includes an L2P mapping, the first portion of the one or more memory arrays includes a first set of memory blocks within the one or more memory arrays, the second portion of the one or more memory arrays includes a second set of memory blocks within the one or more memory arrays, or any combination thereof.

The data transfer component 425 may transfer the data associated with the operating system to a third portion of the one or more memory arrays. In some examples, the data transfer component 425 may transfer a portion of the data associated with the operating system to the one or more memory blocks, the third portion of the one or more memory arrays including the one or more memory blocks. In some examples, the data transfer component 425 may transfer the data stored in the one or more memory blocks to a second set of one or more memory blocks based on the determination, the third portion of the one or more memory arrays including the second set of one or more memory blocks.

The erase component 430 may perform an erase operation on a subset of physical addresses of the set of physical addresses, the subset of physical addresses corresponding to the first portion of the one or more memory arrays and the second portion of the one or more memory arrays. In some examples, the erase component 430 may perform the erase operation on a first set of memory blocks that have a version older than a version of a second set of memory blocks.

The memory block component 435 may identify one or more memory blocks within the one or more memory arrays that are available for data storage. In some examples, the memory block component 435 may identify one or more memory blocks storing data, the one or more memory blocks corresponding to one or more entries of the mapping. In some examples, the memory block component 435 may open a memory block of within the one or more memory arrays, the third portion of the memory system including the memory block.

In some examples, the memory block component 435 may close a host memory block having a version older than a version of the opened memory block, where transferring the data is based on closing the host memory block. In some examples, the memory block component 435 may identify one or more memory blocks of the one or more memory arrays that are associated with one or more unmap commands included in the one or more commands. In some examples, the memory block component 435 may maintain a bitmap of memory blocks that include the data associated with the operating system, the memory blocks that include the data associated with the operating system different than the one or more memory blocks.

The LBA component 440 may determine whether a logical block address of the memory block is within a range of logical block addresses storing the data associated with the operating system. In some examples, the LBA component 440 may identify the logical block address associated with the one or more memory blocks based on reading the metadata, where determining whether the logical block address is within the range of logical block addresses is based on identifying the logical block address.

The validation component 445 may determine that the data stored in the one or more memory blocks is valid data, where transferring the data stored in the one or more memory blocks to the second set of one or more memory blocks is based on determining that the data stored in the memory block is valid data.

The metadata component 450 may read the metadata for the data stored in the one or more memory blocks.

The garbage collection component 455 may perform a garbage collection procedure based on transferring the data. In some examples, the garbage collection component 455 may refrain from performing the garbage collection procedure for the identified one or more memory blocks.

Figure 5:
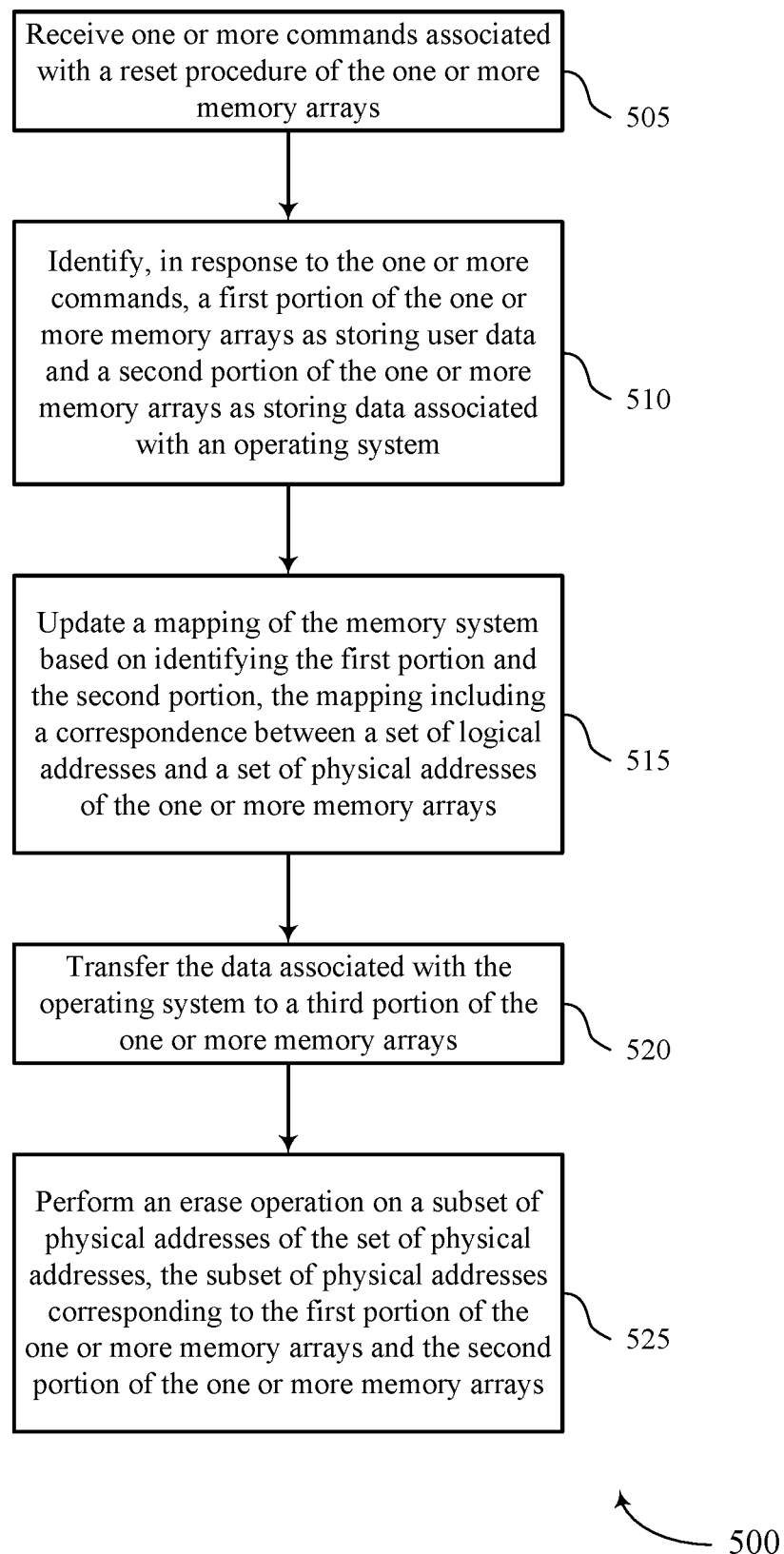
FIG. 5 shows a flowchart illustrating a method or methods that support smart factory reset procedure in accordance with examples as disclosed herein.

FIG. 5 shows a flowchart illustrating a method or methods 500 that supports smart factory reset procedures in accordance with aspects of the present disclosure. The operations of method 500 may be implemented by a memory system or its components (e.g., a memory system controller, a memory device, a local controller) as described herein. For example, the operations of method 500 may be performed by a memory system as described with reference to FIG. 4, which, in some examples, may include a memory array having a plurality of multi-level NAND memory cells. In some examples, a memory system may execute a set of instructions (e.g., software or firmware) to control the functional elements of the memory system to perform aspects of the described functions. Additionally or alternatively, a memory system may perform aspects of the described functions using special-purpose hardware.

At 505, the memory system may receive one or more commands associated with a reset procedure of the one or more memory arrays. The operations of 505 may be performed according to the methods described herein. In some examples, aspects of the operations of 505 may be performed by a command component as described with reference to FIG. 4.

At 510, the memory system may identify, in response to the one or more commands, a first portion of the one or more memory arrays as storing user data and a second portion of the one or more memory arrays as storing data associated with an operating system. The operations of 510 may be performed according to the methods described herein. In some examples, aspects of the operations of 510 may be performed by a portion component as described with reference to FIG. 4.

At 515, the memory system may update a mapping of the memory system based at least in part on identifying the first portion and the second portion, the mapping including a correspondence between a set of logical addresses and a set of physical addresses of the one or more memory arrays. The operations of 515 may be performed according to the methods described herein. In some examples, aspects of the operations of 515 may be performed by a mapping component as described with reference to FIG. 4.

At 520, the memory system may transfer the data associated with the operating system to a third portion of the one or more memory arrays. The operations of 520 may be performed according to the methods described herein. In some examples, aspects of the operations of 520 may be performed by a data transfer component as described with reference to FIG. 4.

At 525, the memory system may perform an erase operation on a subset of physical addresses of the set of physical addresses, the subset of physical addresses corresponding to the first portion of the one or more memory arrays and the second portion of the one or more memory arrays. The operations of 525 may be performed according to the methods described herein. In some examples, aspects of the operations of 525 may be performed by an erase component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving one or more commands associated with a reset procedure of one or more memory arrays included in a memory system, identifying, in response to the one or more commands, a first portion of the one or more memory arrays as storing user data and a second portion of the one or more memory arrays as storing data associated with an operating system, updating a mapping of the memory system based on identifying the first portion and the second portion, the mapping including a correspondence between a set of logical addresses and a set of physical addresses of the one or more memory arrays, transferring the data associated with the operating system to a third portion of the one or more memory arrays, and performing an erase operation on a subset of physical addresses of the set of physical addresses, the subset of physical addresses corresponding to the first portion of the one or more memory arrays and the second portion of the one or more memory arrays.

In some examples of the method 500 and the apparatus described herein, transferring the data may include operations, features, means, or instructions for identifying, within the one or more memory arrays, one or more memory blocks that are available for data storage, and transferring a portion of the data associated with the operating system to the one or more memory blocks, the third portion of the one or more memory arrays including the one or more memory blocks.

In some examples of the method 500 and the apparatus described herein, transferring the data may include operations, features, means, or instructions for identifying, within the one or more memory arrays, one or more memory blocks storing data, the one or more memory blocks corresponding to one or more entries of the mapping, determining whether a logical block address associated with the one or more memory blocks is within a range of logical block addresses for the data associated with the operating system, and transferring the data stored in the one or more memory blocks to a second set of one or more memory blocks based on the determination, the third portion of the one or more memory arrays including the second set of one or more memory blocks.

Some examples of the method 500 and the apparatus described herein may further include operations, features, means, or instructions for determining that the data stored in the one or more memory blocks may be valid data, where transferring the data stored in the one or more memory blocks to the second set of one or more memory blocks may be based on determining that the data stored in the one or more memory blocks is valid data.

Some examples of the method 500 and the apparatus described herein may further include operations, features, means, or instructions for reading metadata for the data stored in the one or more memory blocks, and identifying the logical block address associated with the one or more memory blocks based on reading the metadata, where determining whether the logical block address is be within the range of logical block addresses may be based on identifying the logical block address.

In some examples of the method 500 and the apparatus described herein, the one or more commands include a command to initiate the reset procedure.

Some examples of the method 500 and the apparatus described herein may further include operations, features, means, or instructions for identifying the reset procedure based on the one or more commands including a pattern of unmap commands and a purge command.

Some examples of the method 500 and the apparatus described herein may further include operations, features, means, or instructions for opening a memory block within the one or more memory arrays, the third portion of the one or more memory arrays including the memory block, and closing a host memory block having a version older than a version of the opened memory block, where transferring the data may be based on closing the host memory block.

In some examples of the method 500 and the apparatus described herein, performing the erase operation on the subset of physical addresses may include operations, features, means, or instructions for performing the erase operation on a first set of memory blocks that may have a version older than a version of a second set of memory blocks.

Some examples of the method 500 and the apparatus described herein may further include operations, features, means, or instructions for performing a garbage collection procedure based on transferring the data.

Some examples of the method 500 and the apparatus described herein may further include operations, features, means, or instructions for identifying one or more memory blocks of the one or more memory arrays that may be associated with one or more unmap commands included in the one or more commands, and refraining from performing the garbage collection procedure for the identified one or more memory blocks.

In some examples of the method 500 and the apparatus described herein, identifying the one or more memory blocks may include operations, features, means, or instructions for maintaining a bitmap of memory blocks that include the data associated with the operating system, the memory blocks that include the data associated with the operating system being different than the one or more memory blocks.

In some examples of the method 500 and the apparatus described herein, identifying the one or more memory blocks may be based on updating the mapping.

In some examples of the method 500 and the apparatus described herein, the mapping includes a first table at a first hierarchical level and a second table at a second hierarchical level below the first hierarchical level, and where updating the mapping includes unmapping at least a portion of the first table, at least the portion of the first table corresponding to the first portion of the memory system.

In some examples of the method 500 and the apparatus described herein, the mapping includes an L2P mapping, the first portion of one or more memory arrays includes a first set of memory blocks within the one or more memory arrays, the second portion of the one or more memory arrays includes a second set of memory blocks within the one or more memory arrays, or any combination thereof.

It should be noted that the methods described above describe possible implementations, and that the operations and the steps may be rearranged or otherwise modified and that other implementations are possible. Furthermore, portions from two or more of the methods may be combined.

An apparatus for a method performed by a memory system is described. The apparatus may include one or more memory arrays and a control component coupled with the one or more memory arrays. The control component may be configured to cause the apparatus to receive one or more commands associated with a reset procedure of the one or more memory arrays, identify, in response to the one or more commands, a first portion of the one or more memory arrays as storing user data and a second portion of the one or more memory arrays as storing data associated with an operating system, update a mapping of the memory system based on identifying the first portion and the second portion, the mapping including a correspondence between a set of logical addresses and a set of physical addresses of the one or more memory arrays, transfer the data associated with the operating system to a third portion of the one or more memory arrays, and perform an erase operation on a subset of physical addresses of the set of physical addresses, the subset of physical addresses corresponding to the first portion of the one or more memory arrays and the second portion of the one or more memory arrays.

In some examples, the control component may be further configured to cause the apparatus to identify, within the one or more memory arrays, one or more memory blocks that are available for data storage, and transfer a portion of the data associated with the operating system to the one or more memory blocks, the third portion of the one or more memory arrays including the one or more memory blocks.

In some examples, the control component may be further configured to cause the apparatus to identify, within the one or more memory arrays, one or more memory blocks storing data, the one or more memory blocks corresponding to one or more entries of the mapping, determine whether a logical block address associated with the one or more memory blocks is within a range of logical block addresses for the data associated with the operating system, and transfer the data stored in the one or more memory blocks to a second set of one or more memory blocks based on the determination, the third portion of the one or more memory arrays including the second set of one or more memory blocks.

In some examples, the control component may be further configured to cause the apparatus to determine that the data stored in the one or more memory blocks is valid data, where transferring the data stored in the one or more memory blocks to the second set of one or more memory blocks may be based on determining that the data stored in the one or more memory blocks is valid data.

In some examples, the control component may be further configured to cause the apparatus to read the metadata for the data stored in the one or more memory blocks, and identify the logical block address associated with the one or more memory blocks based on reading the metadata, where determining whether the logical block address is within the range of logical block addresses may be based on identifying the logical block address.

In some examples, the one or more commands may include a command to initiate the reset procedure.

In some examples, the control component may be further configured to cause the apparatus to identify the reset procedure based on the one or more commands including a pattern of unmap commands and a purge command.

In some examples, the control component may be further configured to cause the apparatus to open a memory block within the one or more memory arrays, the third portion of the one or more memory arrays including the memory block, and close a host memory block having a version older than a version of the opened memory block, where transferring the data may be based on closing the host memory block.

In some examples, the control component may be further configured to cause the apparatus to perform the erase operation on a first set of memory blocks that have a version older than a version of a second set of memory blocks.

In some examples, the control component may be further configured to cause the apparatus to perform a garbage collection procedure based on transferring the data.

In some examples, the control component may be further configured to cause the apparatus to identify one or more memory blocks of the one or more memory arrays that are associated with one or more unmap commands included in the one or more commands, and refrain from performing the garbage collection procedure for the identified one or more memory blocks.

In some examples, the control component may be further configured to cause the apparatus to maintain a bitmap of memory blocks that include the data associated with the operating system, the memory blocks that include the data associated with the operating system being different than the one or more memory blocks.

In some examples, the control component may be further configured to cause the apparatus to identify the one or more memory blocks based on updating the mapping.

In some examples, the mapping may include a first table at a first hierarchical level and a second table at a second hierarchical level below the first hierarchical level, and updating the mapping may include unmapping at least a portion of the first table, at least the portion of the first table corresponding to the first portion of the memory system.

In some examples, the mapping may include an L2P mapping, the first portion of the one or more memory arrays may include a set of memory blocks within the one or more memory arrays, and the second portion of the one or more memory arrays may include a second set of memory blocks within the one or more memory arrays, or any combination thereof.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   one or more memory arrays; and
   a control component coupled with the one or more memory arrays and configured to cause the apparatus to:
   receive one or more commands associated with a reset procedure of a memory system that includes the one or more memory arrays;
   determine that the one or more commands associated with the reset procedure comprise a pattern of unmap commands and of a purge command;
   identify, in response to the one or more commands and based at least in part on determining that the one or more commands comprise the pattern of the unmap commands and of the purge command, a first portion of the one or more memory arrays as storing user data and a second portion of the one or more memory arrays as storing data associated with an operating system;
   update a mapping of the memory system based at least in part on identifying the first portion and the second portion, the mapping comprising a correspondence between a set of logical addresses and a set of physical addresses of the one or more memory arrays, wherein updating the mapping comprises unmapping the first portion storing the user data based at least in part on the one or more commands associated with the reset procedure;
   transfer the data associated with the operating system to a third portion of the one or more memory arrays; and
   perform an erase operation on a subset of physical addresses of the set of physical addresses, the subset of physical addresses corresponding to the first portion of the one or more memory arrays and the second portion of the one or more memory arrays.

2. The apparatus of claim 1, wherein the control component is further configured to cause the apparatus to:
   identify, within the one or more memory arrays, one or more memory blocks that are available for data storage; and
   transfer a portion of the data associated with the operating system to the one or more memory blocks, the third portion of the one or more memory arrays comprising the one or more memory blocks.

3. The apparatus of claim 1, wherein the control component is further configured to cause the apparatus to:
   identify, within the one or more memory arrays, one or more memory blocks storing data, the one or more memory blocks corresponding to one or more entries of the mapping;
   determine whether a logical block address associated with the one or more memory blocks is within a range of logical block addresses for the data associated with the operating system; and
   transfer the data stored in the one or more memory blocks to a second set of one or more memory blocks based at least in part on determining that the logical block address is within the range of logical block addresses for the data associated with the operating system, the third portion of the one or more memory arrays comprising the second set of one or more memory blocks.

4. The apparatus of claim 3, wherein the control component is further configured to cause the apparatus to:
   determine that the data stored in the one or more memory blocks is valid data, wherein the control component is configured to cause the apparatus to transfer the data stored in the one or more memory blocks to the second set of one or more memory blocks based at least in part on determining that the data stored in the one or more memory blocks is valid data.

5. The apparatus of claim 3, wherein the control component is further configured to cause the apparatus to:
   read metadata for the data stored in the one or more memory blocks; and
   identify the logical block address associated with the one or more memory blocks based at least in part on reading the metadata, wherein the control component is configured to cause the apparatus to determine whether the logical block address is within the range of logical block addresses based at least in part on identifying the logical block address.

6. The apparatus of claim 1, wherein the one or more commands comprise a command to initiate the reset procedure.

7. The apparatus of claim 1, wherein the control component is further configured to cause the apparatus to:
   identify the reset procedure of the memory system that includes the one or more memory arrays based at least in part on determining that the one or more commands associated with the reset procedure comprise the pattern of the unmap commands and of the purge command.

8. The apparatus of claim 1, wherein the control component is further configured to cause the apparatus to:
open a memory block within the one or more memory arrays, the third portion of the one or more memory arrays comprising the memory block; and
close a host memory block having a version older than a version of the opened memory block, wherein the control component is configured to cause the apparatus to transfer the data based at least in part on closing the host memory block.

9. The apparatus of claim 8, wherein the control component is further configured to cause the apparatus to:
perform the erase operation on a first set of memory blocks that have a version older than a version of a second set of memory blocks.

10. The apparatus of claim 1, wherein the control component is further configured to cause the apparatus to:
perform a garbage collection procedure based at least in part on transferring the data.

11. The apparatus of claim 10, wherein the control component is further configured to cause the apparatus to:
identify one or more memory blocks of the one or more memory arrays that are associated with one or more unmap commands included in the one or more commands; and
refrain from performing the garbage collection procedure for the identified one or more memory blocks.

12. The apparatus of claim 11, wherein the control component is further configured to cause the apparatus to:
maintain a bitmap of memory blocks that include the data associated with the operating system, the memory blocks that include the data associated with the operating system being different than the one or more memory blocks.

13. The apparatus of claim 11, wherein the control component is configured to cause the apparatus to identify the one or more memory blocks based at least in part on updating the mapping.

14. The apparatus of claim 1, wherein the mapping comprises a first table at a first hierarchical level and a second table at a second hierarchical level below the first hierarchical level, and wherein the control component is configured to cause the apparatus to update the mapping by unmapping at least a portion of the first table, the at least the portion of the first table corresponding to the first portion of the memory system.

15. The apparatus of claim 1, wherein the mapping comprises a logical to physical (L2p) mapping table, the first portion of the one or more memory arrays comprising a first set of memory blocks within the one or more memory arrays, the second portion of the one or more memory arrays comprising a second set of memory blocks within the one or more memory arrays, or any combination thereof.

16. A non-transitory computer-readable medium storing code comprising instructions, which when executed by a processor of an electronic system that comprises a memory system, cause the electronic system to:
receive one or more commands associated with a reset procedure of the memory system, wherein the memory system comprises one or more memory arrays;
determine that the one or more commands associated with the reset procedure comprise a pattern of unmap commands and of a purge command;
identify, in response to the one or more commands and based at least in part on determining that the one or more commands comprise the pattern of the unmap commands and of the purge command, a first portion of the one or more memory arrays as storing user data and a second portion of the one or more memory arrays as storing data associated with an operating system;
update a mapping of the memory system based at least in part on identifying the first portion and the second portion, the mapping comprising a correspondence between a set of logical addresses and a set of physical addresses of the one or more memory arrays, wherein updating the mapping comprises unmapping the first portion storing the user data based at least in part on the one or more commands associated with the reset procedure;
transfer the data associated with the operating system to a third portion of the one or more memory arrays; and
perform an erase operation on a subset of physical addresses of the set of physical addresses, the subset of physical addresses corresponding to the first portion of the one or more memory arrays and the second portion of the one or more memory arrays.

17. The non-transitory computer-readable medium of claim 16, wherein the instructions, when executed by the processor of the electronic system, further cause the electronic system to:
identify, within the one or more memory arrays, one or more memory blocks that are available for data storage; and
transfer a portion of the data associated with the operating system to the one or more memory blocks, the third portion of the one or more memory arrays comprising the one or more memory blocks.

18. The non-transitory computer-readable medium of claim 16, wherein instructions, when executed by the processor of the electronic system, further cause the electronic system to:
identify, within the one or more memory arrays, one or more memory blocks storing data, the one or more memory blocks corresponding to one or more entries of the mapping;
determine whether a logical block address associated with the one or more memory blocks is within a range of logical block addresses for the data associated with the operating system; and
transfer the data stored in the one or more memory blocks to a second set of one or more memory blocks based at least in part on determining that the logical block address is within the range of logical block addresses for the data associated with the operating system, the third portion of the one or more memory arrays comprising the second set of one or more memory blocks.

19. The non-transitory computer-readable medium of claim 16, wherein the one or more commands comprise a command to initiate the reset procedure.

20. The non-transitory computer-readable medium of claim 16, wherein the instructions are further executable by the processor to:
identify the reset procedure of the memory system that includes the one or more memory arrays based at least in part on determining that the one or more commands associated with the reset procedure comprise the pattern of the unmap commands and of the purge command.

21. A method performed by a memory system that includes one or more memory arrays, the method comprising:
receiving one or more commands associated with a reset procedure of the one or more memory arrays;

determining that the one or more commands associated with the reset procedure comprise a pattern of unmap commands and of a purge command;

identifying, in response to the one or more commands and based at least in part on determining that the one or more commands comprise the pattern of the unmap commands and of the purge command, a first portion of the one or more memory arrays as storing user data and a second portion of the one or more memory arrays as storing data associated with an operating system;

updating a mapping of the memory system based at least in part on identifying the first portion and the second portion, the mapping comprising a correspondence between a set of logical addresses and a set of physical addresses of the one or more memory arrays, wherein updating the mapping comprises unmapping the first portion storing the user data based at least in part on the one or more commands associated with the reset procedure;

transferring the data associated with the operating system to a third portion of the one or more memory arrays; and performing an erase operation on a subset of physical addresses of the set of physical addresses, the subset of physical addresses corresponding to the first portion of the one or more memory arrays and the second portion of the one or more memory arrays.

22. The method of claim 21, wherein transferring the data comprises:

identifying, within the one or more memory arrays, one or more memory blocks that are available for data storage; and transferring a portion of the data associated with the operating system to the one or more memory blocks, the third portion of the one or more memory arrays comprising the one or more memory blocks.

23. The method of claim 21, wherein transferring the data comprises:

identifying, within the one or more memory arrays, one or more memory blocks storing data, the one or more memory blocks corresponding to one or more entries of the mapping;

determining whether a logical block address associated with the one or more memory blocks is within a range of logical block addresses for the data associated with the operating system; and transferring the data stored in the one or more memory blocks to a second set of one or more memory blocks based at least in part on determining that the logical block address is within the range of logical block addresses for the data associated with the operating system, the third portion of the one or more memory arrays comprising the second set of one or more memory blocks.

24. The method of claim 21, wherein the one or more commands comprise a command to initiate the reset procedure.

25. The method of claim 21, further comprising:

identifying the reset procedure of the memory system that includes the one or more memory arrays based at least in part on determining that the one or more commands associated with the reset procedure comprise the pattern of the unmap commands and of the purge command.

* * * * *